United States Patent [19]

Davis

[11] 4,318,060
[45] Mar. 2, 1982

[54] OPTICALLY PUMPED ATOMIC IODINE LASER

[75] Inventor: Steven J. Davis, Albuquerque, N. Mex.

[73] Assignee: The United States of America as represented by the Secretary of the Air Force, Washington, D.C.

[21] Appl. No.: 35,136

[22] Filed: May 1, 1979

[51] Int. Cl.$^3$ .............................................. H01S 3/00
[52] U.S. Cl. ...................................... 372/70; 372/55
[58] Field of Search ................... 331/94.5 G, 94.5 CP

[56] References Cited

U.S. PATENT DOCUMENTS

| 4,136,317 | 1/1979 | Stregack et al. | 331/94.5 P |
| 4,151,486 | 4/1979 | Itzkan et al. | 331/94.5 P |
| 4,229,711 | 10/1980 | Schimitschek et al. | 331/94.5 G |

OTHER PUBLICATIONS

"Quantum Efficiencies for the Production of Electronically Excited Iodine Atoms I($5p^s2P$) Following Laser Photolysis of $I_2$ Near 5000Å", by Burde et al., *Physical Review A*, vol. 10, No. 6, Dec. 1974.

*Primary Examiner*—William L. Sikes
*Assistant Examiner*—Léon Scott, Jr.

*Attorney, Agent, or Firm*—Donald J. Singer; Thomas L. Kundert

[57] ABSTRACT

An optically pumped atomic iodine laser with a lasing cavity formed by a sealed cell containing iodine vapor as the lasing medium. A tunable dye laser having an output wavelength in the 493-501 nm range is oriented so that its beam is directed into the lasing cavity. This pumps the iodine vapor and results in its dissociation into an atomic iodine medium that lases at 1.315 microns. An optical cavity is formed by two mirrors mounted around the sealed cell on the optical axis of the lasing cavity in a substantially confocal configuration. The two mirrors are more than 99.9% reflective of radiation emitted by the lasing iodine vapor, but pass more than 80% of the radiation from the dye laser. A total reflector to radiation from the dye laser is positioned outside the optical cavity to reflect radiation from the dye laser back through the lasing cavity. Mode matching lenses are mounted between the dye laser and the sealed cell to shape the dye laser beam to the approximate mode shape of the lasing cavity. The iodine laser output beam is passed through a long pass filter to remove any remaining dye laser beam. This laser is capable of indefinite use without replenishment of the lasing medium and the wavelength of its output beam is independent of the wavelength of the pumping beam from the dye laser.

5 Claims, 3 Drawing Figures

OPTICALLY PUMPED ATOMIC IODINE LASER

STATEMENT OF GOVERNMENT INTEREST

The invention described herein may be manufactured and used by or for the Government for governmental purposes without the payment of any royalty thereon.

BACKGROUND OF THE INVENTION

There has been widespread interest in both atomic (I) and molecular ($I_2$) iodine lasers in the last few years. Photodissociation I lasers and optically pumped $I_2$ lasers have been investigated and reported on in the literature. $I_2$ lasers offer tunable output from approximately 544 to 1350 nm and have been operated in both a pulsed and continuous wave (CW) mode of operation. The iodine atom ($^2P_{\frac{1}{2}}$) has good energy storage characteristics and there are large scale programs underway for investigating the scaling of a fusion laser employing iodine. Also, recently, a chemically pumped iodine laser has been demonstrated.

A small, low power, rapidly pulsed or CW I laser would be extremely useful as a diagnostic tool for probing the lasing medium in lasers like those mentioned above that are being developed. Such things as medium homogeneity and small signal gain/loss can be determined by directing the output beam from the small I laser through the lasing medium of the laser being investigated. The condition of the output beam prior to entry into and after passing through the lasing medium being investigated can be monitored and changes in the output beam interpreted to analyze the medium being investigated. The only pulsed lasers presently available for this type of diagnostic measurement are photodissociation lasers employing iodine compounds such as $CF_3I$ as the lasing medium. The $CF_3I$ or similar compound is photodissociated to produce atomic iodine by use of flashlamps. The use of flashlamps to dissociate $CF_3I$ or $C_3F_7I$ contained in a quartz tube is taught in U.S. Pat. No. 3,900,803 issued to William Thomas et al. Unfortunately the $CF_3I$ or similar compound dissociated to form the atomic iodine lasing medium does not recombine with 100% efficiency to reform the original iodide compound. This quickly leads to a degradation of the laser's output and the lasing cavity must be cleaned out and new iodide compound added after only a few shots of the laser. The cleaning out and adding new iodide compound is often required after two or three shots. The number of shots between cleanings has been increased somewhat in some instances by utilizing a process of freezing out impurities in the lasing medium. However, these prior art lasers cannot operate as a sealed system and rapidly pulsed operation is difficult because of the requirement for cleanout and the addition of fresh iodide compound. CW operation is not possible.

The need for an atomic iodine laser capable of extended pulsed or CW operation was recognized and this need is met by the present invention. Accordingly, one of the principal objects of the present invention is to provide an atomic laser capable of rapid repetitive pulsed or continuous operation over a long period of time without maintenance or replenishment of the lasing medium.

Another object of the present invention is to provide an atomic laser that is optically pumped by a laser beam and delivers an output beam of coherent radiation whose wavelength is independent of the wavelength of the pumping laser beam.

SUMMARY OF THE INVENTION

The invention is the first atomic iodine laser in which molecular iodine vapor ($I_2$) is pumped by the output beam of a dye laser in such a way as to cause atomic iodine lasing. Previously only by using flashlamps on compounds such as $CF_3I$ was atomic lasing obtained. The invention is also the first atomic laser of any kind in which a parent diatomic molecule is photodissociated by a laser beam to yield atomic lasing. An atomic laser constructed in accordance with the invention is capable of operation over a long period of time without any maintenance on the lasing cavity or replenishment of the lasing material.

This is accomplished by employing a sealed cell containing an $I_2$ vapor as the lasing cavity for the atomic laser. The $I_2$ is dissociated into atomic iodine (I) by optical pumping with the beam from a tuneable dye laser. The dye laser and sealed cell are positioned such that the optical axes of the dye laser and lasing cavity coincide, and the dye laser beam is directed into the sealed cell to accomplish what is termed longitudinal pumping of the $I_2$ vapor in the lasing cavity. Two mirrors mounted around the lasing cell, and on the optical axis thereof, form the optical cavity for the atomic iodine laser. These two mirrors pass more than 80% of the dye laser beam but reflect more than 99.9% of the radiation emitted by the lasing atomic iodine. A total visible radiation reflector is positioned on the optical axis outside the optical cavity near the mirror furthest away from the dye laser. The total reflector reflects any of the dye laser beam reaching it back toward the lasing cavity to enhance the pump energy deposited in the iodine vapor contained therein. The output beam is outcoupled through one of the mirrors making up the optical cavity and thereafter passed through a long pass filter. The long pass filter removes any remaining dye laser beam.

DETAILED DESCRIPTION OF THE INVENTION

Figure 1:
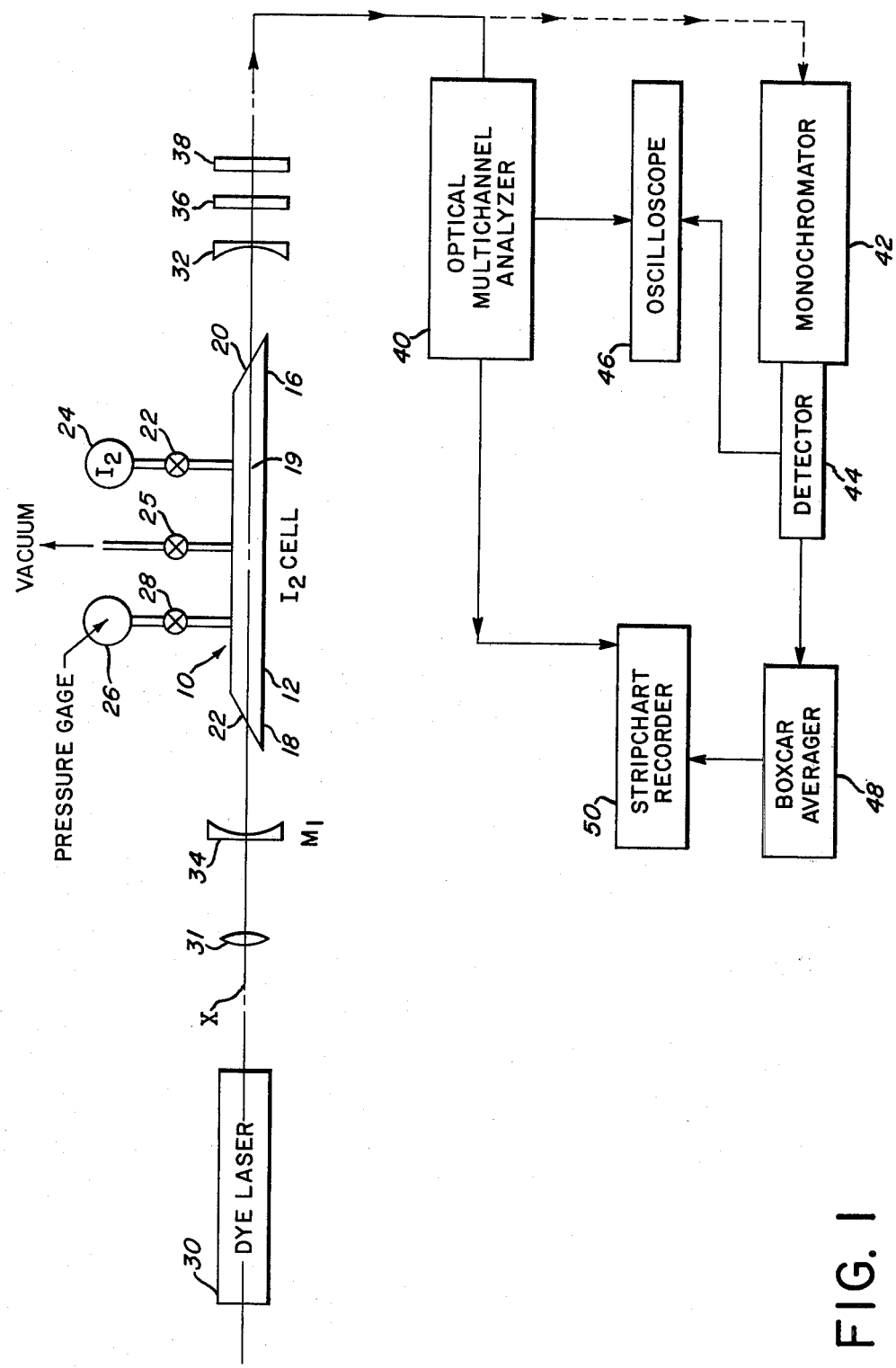
FIG. 1 is a schematic diagram of the atomic iodine laser and components used to analyze the output beam.

Referring now to FIG. 1 of the drawing the various components of the atomic iodine laser and associated monitoring equipment will be described. A cell 10 of Pyrex glass includes an elongated tubular portion 12. Tubular portion 12 is closed at opposite ends 16 and 18 by Brewster's—angle end windows 20 and 22 to form a lasing cell or cavity 19 therebetween. $I_2$ vapor is admitted to the lasing cavity by means of valve 22 that opens to place chamber 24 in communication with the interior of the lasing cavity after evacuation through valve 25 which is connected to a vacuum source. In actual use the cell was pumped to $10^{-3}$ Torr and then filled with $I_2$ vapor at room temperature vapor pressure (approximately 300 mT) to achieve a suitable $I_2$ vapor equilibrium condition. Pressure conditions within the sealed cell can be monitored by a pressure readout device 26 that can be placed in communication with the lasing cavity by valve 28. A laser 30 is positioned adjacent the sealed cell and oriented such that its output beam is directed into lasing cavity 19. The laser utilized was a Phase-R Model DL 1200 flashlamp pumped dye laser. The output was tuned with a tandem prism arrangement and was typically 5 A FWHM (full width at half maximum). The pulse duration employed in the dye laser was less than $0.4\mu$ seconds, and nominal energy per pulse was 40 mj. Exiton C-504 dye in MeOH was used to cover the wavelength range 4900–5200 A. The wavelength of the dye laser can be measured with a Princeton Applied Research Optical Multi-Channel Analyzer. Suitable mode matching lenses 31 are provided to shape the dye laser beam to the approximate mode shape of the lasing cavity.

The optical cavity was formed by two mirrors 32 and 34 mounted adjacent the sealed cell and positioned such that their optical axes coincided with the axes of the lasing cavity and that of the dye laser, which axes all fall on the line designated X in FIG. 1. Mirrors 32 and 34 are one meter radius mirrors mounted in a nearly confocal configuration. The mirrors are both greater than 99.9% reflecting at 1.315 microns, the wavelength of the iodine laser output, but they pass more than 80% of the output beam from the dye laser.

A total visible radiation reflector 36 is positioned along the optical axis of the lasing cavity, and outside the optical cavity, for the purpose of reflecting radiation from the dye laser that has passed through the lasing cavity and mirror 32 back into the lasing cavity to enhance the pumped energy deposited in the $I_2$ vapor. Reflector 36 is a total reflector for radiation in the wavelength of 4,000–6,000 A, a range that includes the wavelength of the pumping beam generated by the dye laser. Reflector 36 passes the 1.315 micron radiation. Mirror 32 is the output coupler for the optical cavity formed by mirrors 32 and 34. The outcoupled beam is passed through a long pass filter 38 which removes any remaining pump beam.

As shown in FIG. 1 the output beam is directed either to an optical multi-channel analyzer 40, or through a monochromator 42 to a detector 44. The output of detector 44 is either displayed on an oscilloscope 46 or is analyzed with a boxcar averager 48 and displayed on a stripchart recorder 50. The optical multi-channel analyzer 40 is a device that sees all wavelengths at one time and its output is displayed on an oscilloscope or stripchart recorder. The device 40 is a preferred instrument for analyzing the output of the atomic iodine laser, but it is an expensive device that can be replaced by the monochromator, detector and boxcar averager. It should be noted that none of these analyzing instruments form a part of the invention but they were used in verifying its operation.

Figure 2:
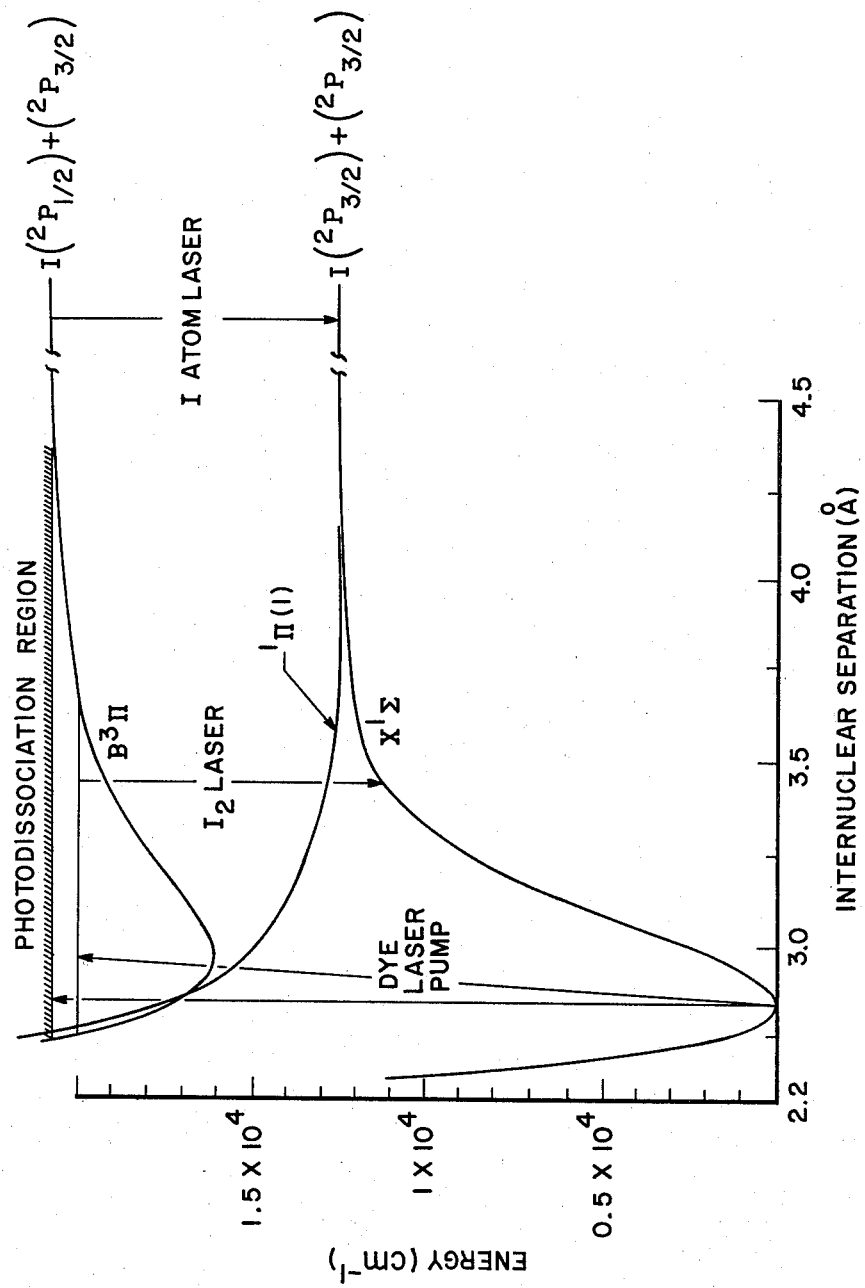
FIG. 2 is a chart of curves showing the potential surfaces for the $X'\Sigma$ and $B^3\pi$ states of $I_2$. The chart provides a basis for explaining the principles of operation of a laser constructed in accordance with the invention.

The principle of operation of this laser can be explained from FIG. 2 which shows the potential surfaces for the $X'\Sigma$, $'\pi(1)$ and $B^3\pi$ states of $I_2$. The $B^3\pi$ state correlates at infinite separation of the two iodine atoms to one $^2P\frac{1}{2}$ and one $^2P3/2$ atom. The $^2P\frac{1}{2}$ spin orbit state lies 7608 cm$^{-1}$ above the $^2P3/2$ term and this is the transition of the existing iodine laser at $1.3152\mu$. The photodissociation energy of $I_2$ is 4995 A, thus one expects both high dissociation efficiency of $I_2$ and high production efficiencies of $I(^2P\frac{1}{2})$ atoms when $I_2$ is irradiated with photons whose wavelength is less than approximately 4995 A. In a paper published in Physics Review A 10 1917 (1974) Burde et al found unit quantum efficiency for $I(^2P\frac{1}{2})$ production when $I_2$ was pumped with a low energy dye laser operating at a wavelength less than 5000 A. In addition they found high efficiencies, more than 50%, at pump excitation wavelength as long as 5050 A. It is important to note that total photodissociation of $I_2(B^3\pi)$ yields equal abundances of $^2P\frac{1}{2}$ and $^2P3/2$ atoms. Because the degeneracy ratio of $^2P3/2$ to $^2P\frac{1}{2}$ is two, only 33% of the iodine atoms need to be in the $^2P\frac{1}{2}$ state for a population inversion to exist, consequently, efficient laser dissociation will yield inverted iodine atoms. The $'\pi(1)$ state dissociates to ground state atoms and reduces the efficiency of the inversion production.

The iodine laser was operated in a a pulsed mode and the pulses therefrom were passed through a McPhereson 0.3 meter monochromator and were detected with an InAs detector whose output was either displayed on an oscilloscope or analyzed with a boxcar averager. Both the dye laser and iodine laser output energies were measured using a calibrated pyroelectric detector. The pump source was a Phase-R model DL 1200 flashlamp pumped dye laser. The output was tuned with a tandem prism arrangement and was typically 5 A FWHM. The pulse duration was $>0.4$ $\mu$sec, and nominal energy per pulse was 40 mj. Exiton C-504 dye in MeOH was used to cover the wavelength range 4900–5200 A. The wavelength of the dye laser was measured with a PAR optical multichannel analyzer.

In the first attempts to observe atomic iodine lasing, the dye laser was tuned to 5100 A, and strong molecular iodine lasing at approximately 1.34 microns was observed due to the $I_2(B^3\pi X'\Sigma)$ system. The $I_2$ lasing was accompanied by strong, visible B-X fluorescence. As the output wavelength of approximately 5000 A, the visible fluorescence became very weak, and the $I_2$ lasing ceased for pump wavelengths between 5025 and 5010 A. Atomic iodine lasing action resumed as the dye laser was tuned through the wavelength range 5010 A-4940 A. However, the visible fluorescence remained extremely weak due to iodine atom recombination.

Figure 3:
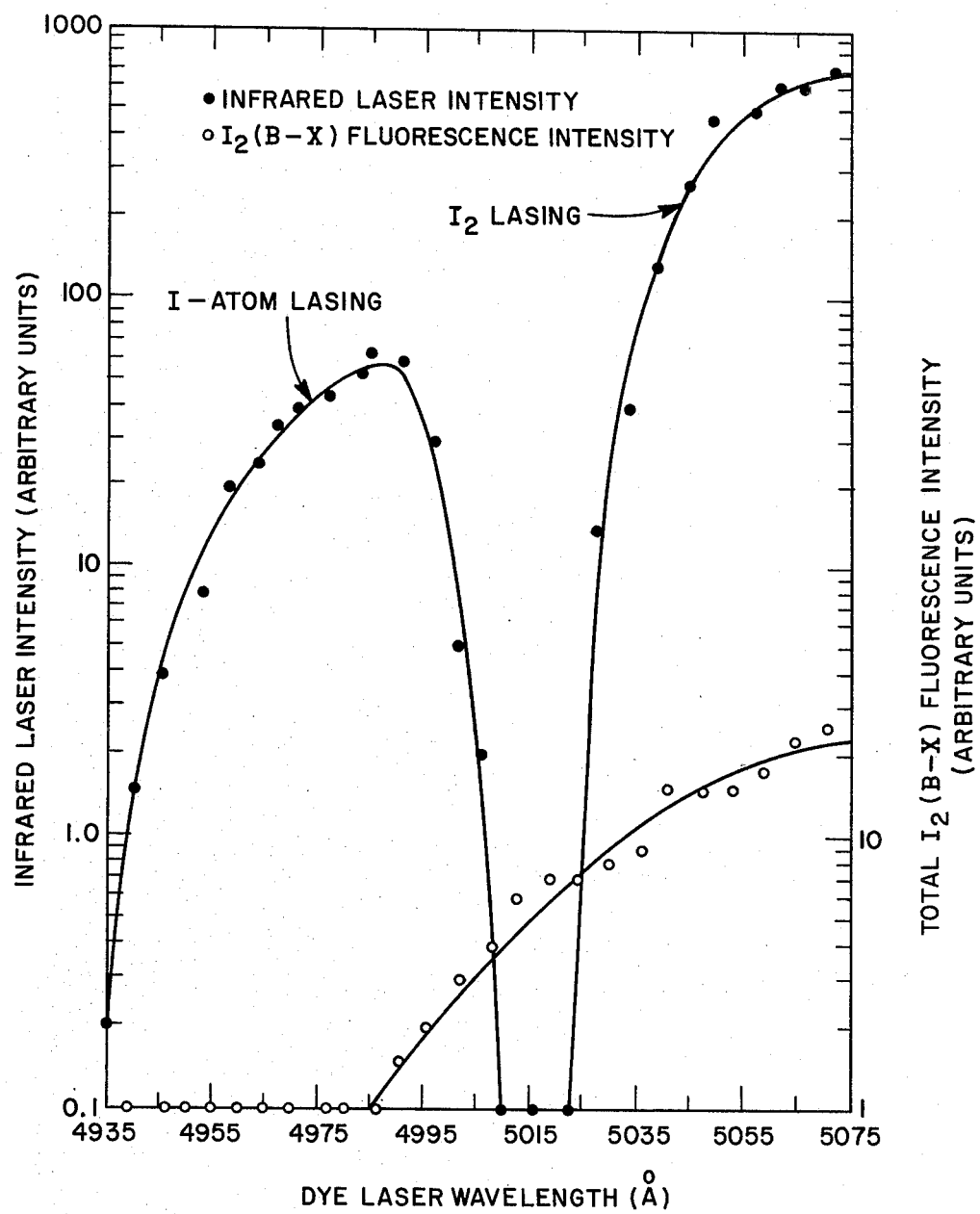
FIG. 3 is a chart of curves that discloses how molecular iodine ($I_2$) lasing occurred at pump wavelengths above 5025 A, no lasing occurred in the pump wavelength range of 5010 A to 5025 A, and atomic iodine (I) lasing occurred through the pump wavelength range of 5010 A-4940 A.

Spectral analysis of the infrared laser output revealed that the laser produced by pumping at wavelengths longer than 5025 A had a variable output wavelength which depended upon the pump wavelength, as has been previously reported. However, the spectral output of the atomic iodine laser, produced by pumping at wavelengths shorter than 5010 A was independent of the pump wavelength and was measured to be 13152 A which is the frequency of the transition in atomic iodine. The relative outputs, measured with an uncalibrated InAs detector, of the optically pumped atomic and molecular iodine lasers as a function of pump wavelength are shown in FIG. 3. The null region between 5010–5025 A was reduced in subsequent experiments by increasing the output power of the dye laser. I atom lasing was observed for dye laser wavelengths as long as 5015 A. $I_2$ lasing for wavelengths longer than 5017 A. Also, shown on FIG. 3 is the $I_2$ fluorescence intensity (observed between 6000 and 12000 A with a photomultiplier tube) as a function of pump wavelength. The power curve of the C-504 dye cannot explain the absence of lasing for $\lambda$ pump 5010–5025 A since the energy/pulse of the dye laser was found to be nearly constant through the range 4930–5100 A. This absence of lasing near the dissociation limit probably results from insufficient pumping of either the atom or molecule since both compete for the available pump photons.

The maximum measured efficiencies, defined as I-R-Energy/pump energy, of the I and $I_2$ lasers were $1 \times 10^{-5}$ and $5 \times 10^{-4}$, respectively. The linewidth of the dye laser (5 A) will necessarily result in low efficiencies for the $I_2$ laser since only a small fraction of the available photons will pump a single rotational level which will lase. Indeed, previous workers have shown that the efficiency of an optically pumped $Br_2$[10] laser was greatly enhanced when the linewidth of the pump source is narrowed so the single rovibronic transitions are pumped. One would not expect that a wide linewidth would seriously lower the efficiency of the atomic laser because the pumping process is to a continuum of energy levels. No experiments were tried in which the linewidth was narrowed below 5 A.

The pulse width of the atomic iodine laser was <0.4 $\mu$sec and the fall time was less than 0.2 $\mu$sec. Thus, the laser will be useful for measuring gain by the technique of photon cavity lifetimes.

The reason for cutoff of lasing below 4940 A (see FIG. 3) cannot be entirely explained by the power curve of the dye. However, the absorption coefficient for $I_2$ decreases for shorter excitation wavelengths in this region. Because $I_2$ is the source of I atoms, if the I atom laser is operating only slightly above threshold the reduction in $I_2$ dissociation might explain this cutoff. Indeed, the short wavelength cutoff of the iodine atom laser was lowered by raising the energy/pulse of the dye laser. The $'\pi(1)$ repulsive state may also be responsible for the short wavelength cutoff since absorption coefficient for the $'\pi(1) \leftarrow \chi\Sigma$ system is increasing in this region. Thus, the inversion production efficiency is decreasing. However, no lasing could be observed at pump wavelengths less than 4930 A even at 40 mj pulse energy. The $'\pi(1)$ state may also be responsible for this. The pump energy threshold was approximately 25 mj at 4990 A. However, this is probably not the lower limit as careful trimming of the pump beam to the cavity mode was not employed.

The maximum theoretical energy per pulse can be estimated from the total number of iodine molecules dissociated in the volume defined by the cavity mode. Assuming complete dissociation in the mode volume, and using the dimensions of the optical cavity and the known vapor pressure of room temperature iodine, the calculated $E_{max} \sim 350$ $\mu$j. The max energy/pulse measured was 1.0 $\mu$j. This rather large discrepancy is probably due to both incomplete $I_2$ dissociation and $^2P_{\frac{1}{2}}$ iodine atom quenching during the pumping processes. The iodine atom laser showed no degradation in performance for repetition rates of up to 2 HZ at which point the dye laser output became unstable. Thus, the system may be used as a rapidly pulsed laser in a sealed cell. The system has also been run with up to 100 tors of He or Ne in the cell.

This completes the detailed description of the invention and while a preferred embodiment has been described herein, it should be understood that modifications and other applications of the invention will be obvious to those skilled in the laser art. For example, the lasing technique described herein could readily be applied to other molecules such as $Br_2$ which would be expected to produce lasing action at approximately 2.7 microns. Also for some applications, it is desirable to add a buffer gas such as helium or neon to the lasing medium.

What is claimed is:

1. A laser pumped atomic laser for emitting coherent radiation whose wavelength is independent of the wavelength of the laser employed to pump said atomic laser over the range of 493–501 nm, said atomic laser comprising:

a sealed cell means forming a lasing cavity, said lasing cavity containing a nondegradable active gaseous medium that is substantially composed of diatomic molecules of a single chemical element, capable of being pumped to a lasing state repeatedly, by photodissociation of the diatomic molecules into atoms, said sealed cell having Brewster's-angle end windows at opposite ends thereof, laser pump means for generating a beam of coherent radiation that pumps the gaseous medium in said lasing cavity to a lasing condition, said laser pump means being positioned adjacent said sealed cell means and oriented such that the optical axes of said laser pump means and said lasing cavity coincide, and the beam from said laser pump means enters said lasing cavity through one of the end windows to pump the gaseous medium and cause a population inversion therein, and two mirrors mounted in a substantially confocal configuration on the optical axis of said lasing cavity to form an optical cavity for said laser to extract a beam of coherent radiation from the lasing mixture in said lasing cavity, the first one of said two mirrors being positioned between said laser pump means and said sealed cell such that the beam from said laser pump means passes therethrough into the lasing cavity, the second one of said two mirrors being positioned on the side of said sealed cell away from said laser pump means, said two mirrors transmitting the beam from said laser pump means but reflecting substantially all radiation emitted by the gaseous medium in the lasing cavity.

2. The laser recited in claim 1 wherein the lasing medium in said sealed cell is $I_2$ vapor.

3. The laser recited in claim 2 wherein said laser pump means is a tuneable dye laser capable of emitting coherent radiation having a wavelength in the range of 5010 A° to 4930 A°, and the atomic laser emits coherent radiation having a wavelength of 1.315 microns.

4. The laser recited in claim 3 wherein a reflector means is mounted on the optical axis of the lasing cavity outside the optical cavity for reflecting radiation from said laser pump means back into the lasing cavity.

5. The laser recited in claim 4 wherein a mode matching lens means mounted between said laser pump means and said sealed cell to shape the beam from the laser pump means to approximately the mode shape of the lasing cavity.

* * * * *

UNITED STATES PATENT AND TRADEMARK OFFICE
CERTIFICATE OF CORRECTION

PATENT NO. : 4,318,060

DATED : March 2, 1982

INVENTOR(S) : Steven J. Davis

It is certified that error appears in the above—identified patent and that said Letters Patent is hereby corrected as shown below:

Col. 4, line 20, delete "a" (first occurrence).

Col. 6, line 52 (claim 3), change "A°" to --A-- (both occurrences).

Signed and Sealed this

Twenty-second Day of June 1982

[SEAL]

Attest:

GERALD J. MOSSINGHOFF

Attesting Officer     Commissioner of Patents and Trademarks